(12) United States Patent
Rasheed et al.

(10) Patent No.: US 7,822,275 B2
(45) Date of Patent: Oct. 26, 2010

(54) METHOD FOR DETECTING WATER REGIONS IN VIDEO

(75) Inventors: Zeeshan Rasheed, Sterling, VA (US); Niels Haering, Reston, VA (US); Omar Javed, Herndon, VA (US); Xiao Chun Cao, Reston, VA (US); Andrew J. Chosak, Arlington, VA (US); Himaanshu Gupta, Reston, VA (US); Khurram Hassan-Shafique, Ashburn, VA (US); Mun Wai Lee, Reston, VA (US); Alan J. Lipton, Herndon, VA (US); Haiying Liu, Chantilly, VA (US); Donald G. Madden, Falls Church, VA (US); Geoffrey Taylor, Reston, VA (US); Li Yu, Herndon, VA (US); Peter L. Venetianer, McLean, VA (US); Zhong Zhang, Herndon, VA (US); Wei Hong Yin, Herndon, VA (US)

(73) Assignee: ObjectVideo, Inc., Reston, VA (US)

( * ) Notice: Subject to any disclaimer, the term of this patent is extended or adjusted under 35 U.S.C. 154(b) by 539 days.

(21) Appl. No.: 11/757,738

(22) Filed: Jun. 4, 2007

(65) Prior Publication Data

US 2008/0298636 A1 Dec. 4, 2008

(51) Int. Cl.
*G06K 9/34* (2006.01)
(52) U.S. Cl. ...................................... 382/173

(58) Field of Classification Search ................. 382/109, 382/170, 173
See application file for complete search history.

(56) References Cited

U.S. PATENT DOCUMENTS

| 6,504,951 | B1 * | 1/2003 | Luo et al. | 382/165 |
|---|---|---|---|---|
| 6,724,915 | B1 * | 4/2004 | Toklu et al. | 382/103 |
| 6,837,617 | B1 | 1/2005 | Koltunov et al. | |
| 6,999,600 | B2 | 2/2006 | Venetianer et al. | |
| 7,545,986 | B2 * | 6/2009 | Bachmann | 382/224 |
| 2003/0081836 | A1 * | 5/2003 | Averbuch et al. | 382/199 |
| 2005/0013486 | A1 * | 1/2005 | Wiedemann et al. | 382/181 |
| 2005/0031165 | A1 * | 2/2005 | Olson et al. | 382/103 |
| 2005/0100220 | A1 | 5/2005 | Keaton et al. | |
| 2006/0066719 | A1 | 3/2006 | Haering et al. | |
| 2006/0066722 | A1 | 3/2006 | Yin et al. | |
| 2006/0072010 | A1 | 4/2006 | Haering et al. | |

OTHER PUBLICATIONS

Holman et. al. "The Application of Video Imaging Processing to the Study of Nearshore Processes." Oceanography vol. 6, No. 3, 1993, pp. 78-85.

* cited by examiner

*Primary Examiner*—Brian P Werner
(74) *Attorney, Agent, or Firm*—Venable LLP; Michael A. Satori; Yao Wang

(57) ABSTRACT

A computer-based method for automatic detection of water regions in a video include the steps of estimating a water map of the video and outputting the water map to an output medium, such as a video analysis system. The method may further include the steps of training a water model from the water map; re-classifying the water map using the water model by detecting water pixels in the video; and refining the water map.

28 Claims, 8 Drawing Sheets

METHOD FOR DETECTING WATER REGIONS IN VIDEO

FIELD OF THE INVENTION

Embodiments of the present invention relate to video image processing. More specifically, embodiments of the invention relate to identifying portions of a video image that relate to water in a scene being viewed.

BACKGROUND OF THE INVENTION

Many businesses and other facilities, such as banks, stores, airports, etc., make use of security systems. Among such systems are video-based systems, in which a sensing device, such as a video camera, obtains and records images within its sensory field. For example, a video camera will provide a video record of whatever is within the field-of-view of the camera's lens. Such video images may be monitored by a human operator and/or reviewed later by a human operator. Recent progress has allowed such video images to be monitored also by an automated system, improving detection rates and saving human labor.

In many situations it would be desirable to automatically identify the video image regions which are water in the real world. Likewise it would be desirable for state-of-the-art surveillance systems to adapt to the variations of the scene caused by water areas, as current systems are unable to do so, even if the same systems have been monitoring the same scene for many years.

SUMMARY OF THE INVENTION

Embodiments of the present invention are directed to enabling the automatic detection of water regions in the video images. The embodiments may provide contextual information about the scene and moving targets. This contextual information may be used to enable context-sensitive event detection, and the contextual information may improve target detection, improve tracking and classification, and decrease the false alarm rate of video surveillance systems.

In an exemplary embodiment, the invention may be a computer-based method for automatic detection of water regions in a video, the method including: generating a water map from the video; and outputting the water map to an output medium. The method may further include estimating a water map of the video from video frames; estimating a statistical water model from the estimated water map; re-classifying the estimated water map using the water model and frames of the video; and/or refining the re-classified water map.

In another exemplary embodiment, the invention may be a computer system for automatically detecting water regions in a video, the system including: a water detector module receiving a video to detect the presence of water in the video, and to create a water map; and means for outputting the water map to an output medium. The system may further include a water estimation module to receive the video and to create an estimated water map, a water model training module, to create a water model using the estimated water map, a re-classification module to re-classify the estimated water map using the water model and frames of the video, and to create a water map, and/or a refinement module to refine the water map.

In another exemplary embodiment, the invention may be an apparatus for water detection, the apparatus is configured to perform operations including: generating a water map from the video; and outputting the water map to an output medium. The apparatus may be further configured to perform operations including estimating a water map of the video from video frames; estimating a statistical water model from the estimated water map; re-classifying the estimated water map using the water model and frames of the video; and/or refining the re-classified water map.

In another exemplary embodiment, the invention may be a video processing system including: a video processing device to accept an input video and detect a water region in the input video; and an output medium to output information regarding the detected water region.

DEFINITIONS

The following definitions are applicable throughout this disclosure, including in the above.

A "video" may refer to motion pictures represented in analog and/or digital form.

Examples of video include: television, movies, image sequences from a video camera or other observer, and computer-generated image sequences.

A "frame" may refer to a particular image or other discrete unit within a video.

An "object" may refer to an item of interest in a video. Examples of an object include: a person, a vehicle, an animal, and a physical subject.

A "target" may refer to a computer's model of an object. A target may be derived via image processing, and there is a one-to-one correspondence between targets and objects.

A "target instance," or "instance," may refer to a sighting of an object in a frame.

An "activity" may refer to one or more actions and/or one or more composites of actions of one or more objects. Examples of an activity include: entering; exiting; stopping; moving; raising; lowering; growing; and shrinking.

A "location" may refer to a space where an activity may occur. A location may be, for example, scene-based or image-based. Examples of a scene-based location include: a public space; a store; a retail space; an office; a warehouse; a hotel room; a hotel lobby; a lobby of a building; a casino; a bus station; a train station; an airport; a port; a bus; a train; an airplane; and a ship. Examples of an image-based location include: a video image; a line in a video image; an area in a video image; a rectangular section of a video image; and a polygonal section of a video image.

An "event" may refer to one or more objects engaged in an activity. The event may be referenced with respect to a location and/or a time.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 702.x, etc.

A "sensing device" may refer to any apparatus for obtaining visual information. Examples include: color and monochrome cameras, video cameras, closed-circuit television (CCTV) cameras, charge-coupled device (CCD) sensors, analog and digital cameras, PC cameras, web cameras, and infra-red imaging devices. If not more specifically described, a "camera" refers to any sensing device.

"Autocorrelation" may refer to the correlation between the values of a time series and previous values of the same series. Autocorrelation may be the degree to which the return of a given series is related from period to period. Autocorrelation may be a function of time.

"Image gradient" may refer to a transition between one color and another, or one shade of a color and another, or one density of a color and another at two image locations or space.

"Spatiotemporal property" may refer to the video image properties associated with the space and time together. A spatiotemporal property has both spatial extension and temporal duration.

A "water map" may refer to a mapping of the presence of water in the scene to image locations. A water map may be a binary image indicating, for each pixel, whether the pixel represents water or not. Water maps may be built by recording and modeling the spatiotemporal properties of pixels. For instance, a model may record the likelihood of a pixel being water as a function of image location (x,y) of the pixel and its color value. A model may be used to represent this record and to provide information about the presence of water in the scene.

BRIEF DESCRIPTION OF THE DRAWINGS

Specific embodiments of the invention will now be described in further detail in conjunction with the attached drawings, in which.

DETAILED DESCRIPTION OF EMBODIMENTS OF THE INVENTION

Figure 1:
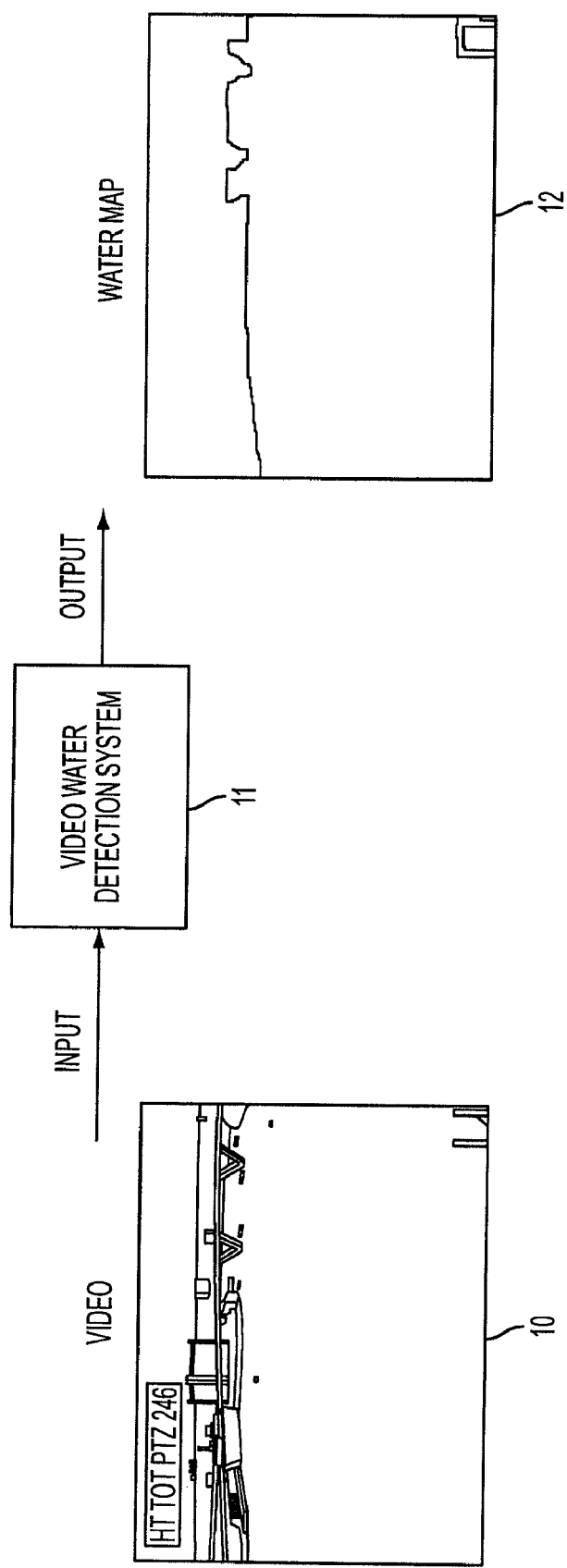
FIG. 1 depicts an exemplary video input and water map output from an exemplary water detection system.

Embodiments of the present invention may provide techniques for creating a water map and water model, which may be useful, in turn, for other video image analysis and surveillance applications. For example, a prediction of a target's path or type may depend in part on whether the target is on water or on land, e.g. whether the target is a boat or a car. FIG. 1 illustrates an exemplary frame of video input (10) and a corresponding water map (12) created by an exemplary video water detection system (11).

Figure 2:
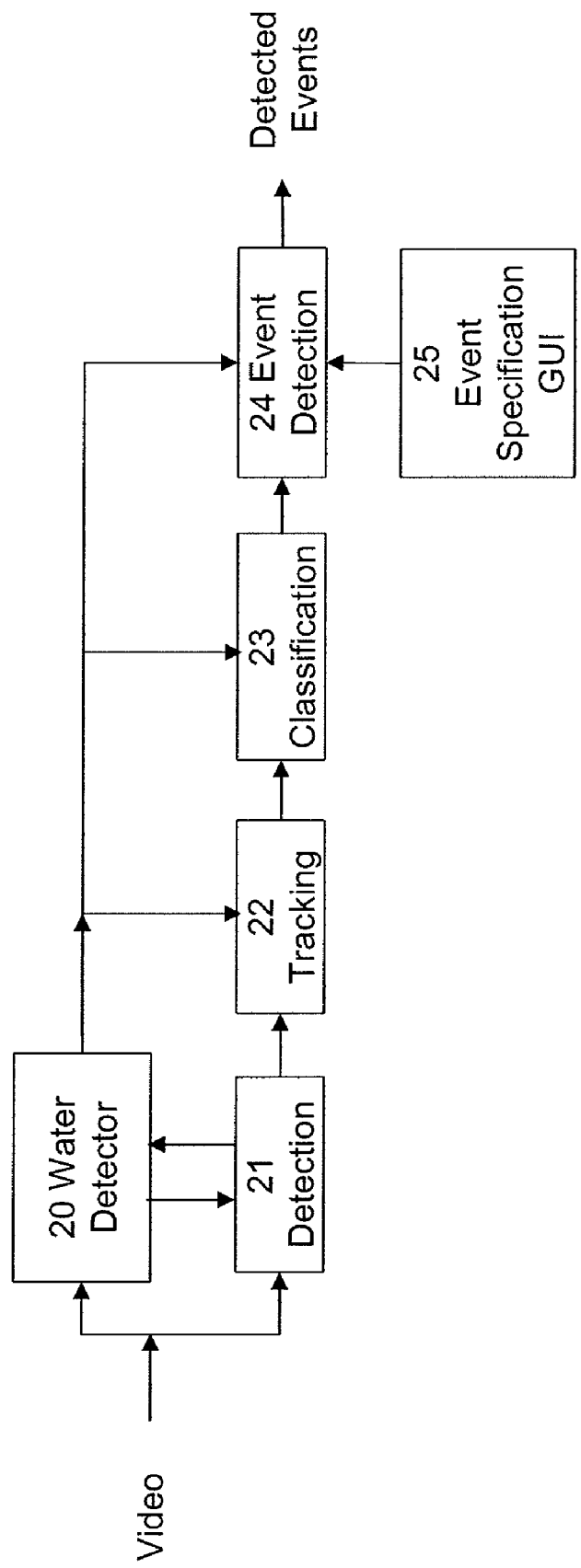
FIG. 2 depicts a flow diagram of a content analysis system that may include embodiments of the invention.

Embodiments of the present invention may comprise part of a general video content analysis system or a video surveillance system. A potential embodiment is illustrated in FIG. 2.

Water detector module (20) may detect the presence of water by processing the video sequence. The resulting information may be passed to detection module (21), tracking module (22), classification module (23), and/or event detection module (24). Detection module (21) may detect an object in the video sequence. Detection module (21) may provide feedback about the location of objects to the water detector module (20) for improved water detection. Tracking module (22) may track a detected object as the object moves through the scene in the video sequence. Tracking module (22) may receive the detected water information from water detector module (20) to aid in analyzing and tracking an object on water. Classification module (23) may classify the object, e.g. as a person or as a vehicle, according to observed characteristics in the video sequence. Classification module (23) may receive the detected water information from water detector module (20) to aid in classification, e.g., if the object is a "vehicle" and is on water, then the object is a boat. These modules may use known or as yet to be discovered techniques.

Event detector module (24) may process the information coming from (20), (21), (22) and (23) containing observed target properties, and may match the observed properties against properties deemed of interest by a user, as specified using event specification module (25). For example, the user may be able to specify such properties of interest by using a graphical user interface (GUI) (25) or other input/output (I/O) interface with the system. Data models may be based on video image attributes, which may include, but which are not limited to, the video image autocorrelation, pixel variance, image gradient etc. This information may be further filtered to achieve spatially and temporally smooth and continuous representations.

Detecting Water by Observation

According to some embodiments of the invention, a water model needs to be learned by observation before the water model can be used. To signal the validity of a water model, the water model may be labeled "mature" only after a statistically meaningful amount of data has been observed. This strategy leaves the system in a default mode until the model has matured. When the water model has matured, the water model may provide information that may be incorporated into the decision making processes of connected algorithmic components. The availability of this additional information may help the algorithmic components to make better decisions.

Not all video frames are necessarily used for training. The upstream components, for example, a video capturing device, may fail, and it is important that the model is shielded from data that is faulty. One technique for dealing with this problem is to use algorithms that carefully analyze the quality of the image. See, e.g., U.S. Publication No. US 2006/0066722 A1, entitled "View Handling in Video Surveillance Systems," which is incorporated herein by reference. This approach may extend the time required for the water model to achieve maturity. However, the prolonged time that many video surveillance systems spend viewing a scene makes this option attractive in that the length of time to maturity is not likely to be problematic.

Figure 3:
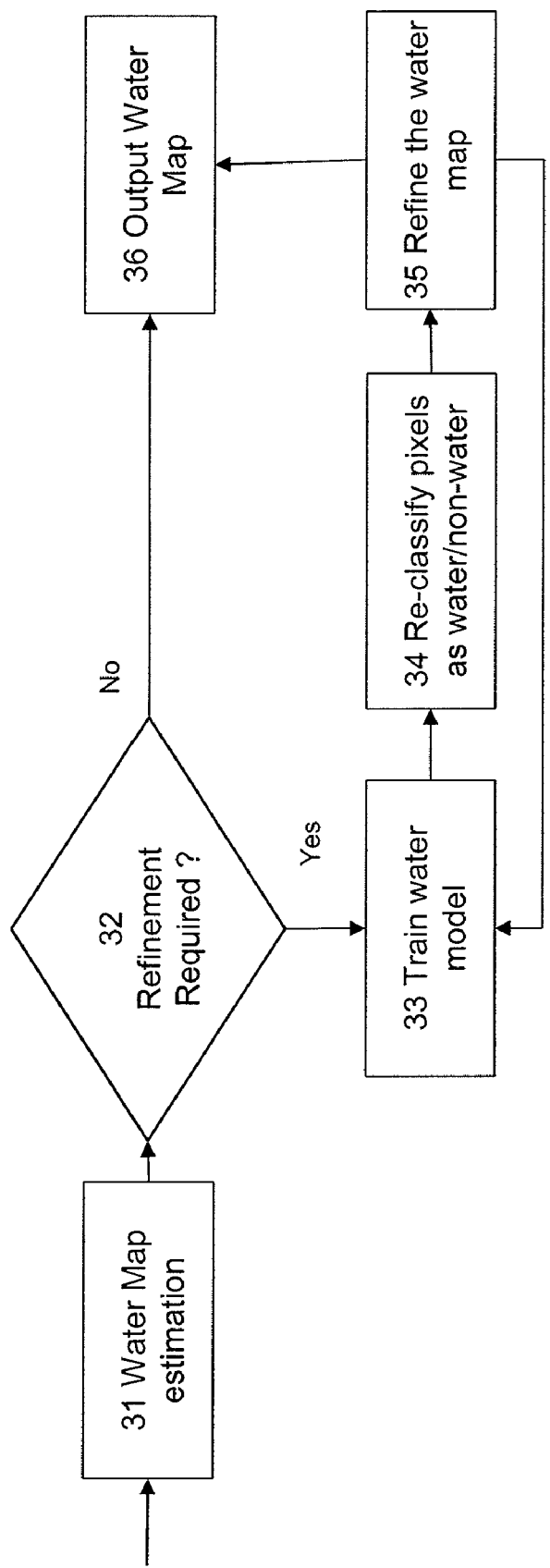
FIG. 3 depicts a flowchart describing estimating a water map, training a water model for refining the water map, classifying pixels as water/non-water, and refining the water map, according to an embodiment of the invention.

An overview of a technique for water detection according to an embodiment of the invention is shown in FIG. 3. The major components may include estimating a water map (31), training a water model (33), re-classifying image pixels as water or non-water (34), further refining the water map (35), and outputting the water map (36).

The water map estimation module (31) may provide an estimate of a water map. If no further refinement is needed (32), the water map by be output (36). If further refinement is desired, then the water map may be used to train a water model (33) that represents the likelihood of a pixel being water given the pixel location in the image and the color of the pixel. This model may be used later to re-classify image pixels as representing water or non-water regions (34). Block (35) may refine the water map by removing outliers or filling in misdetections.

The water map may be output via an output medium. Outputting the water map to an output medium may include, for example, displaying the water map, printing the water map, storing the water map on a computer-readable medium, and/or transmitting or transferring the water map to a video analysis system or component.

Water Map Estimation

Figure 4:
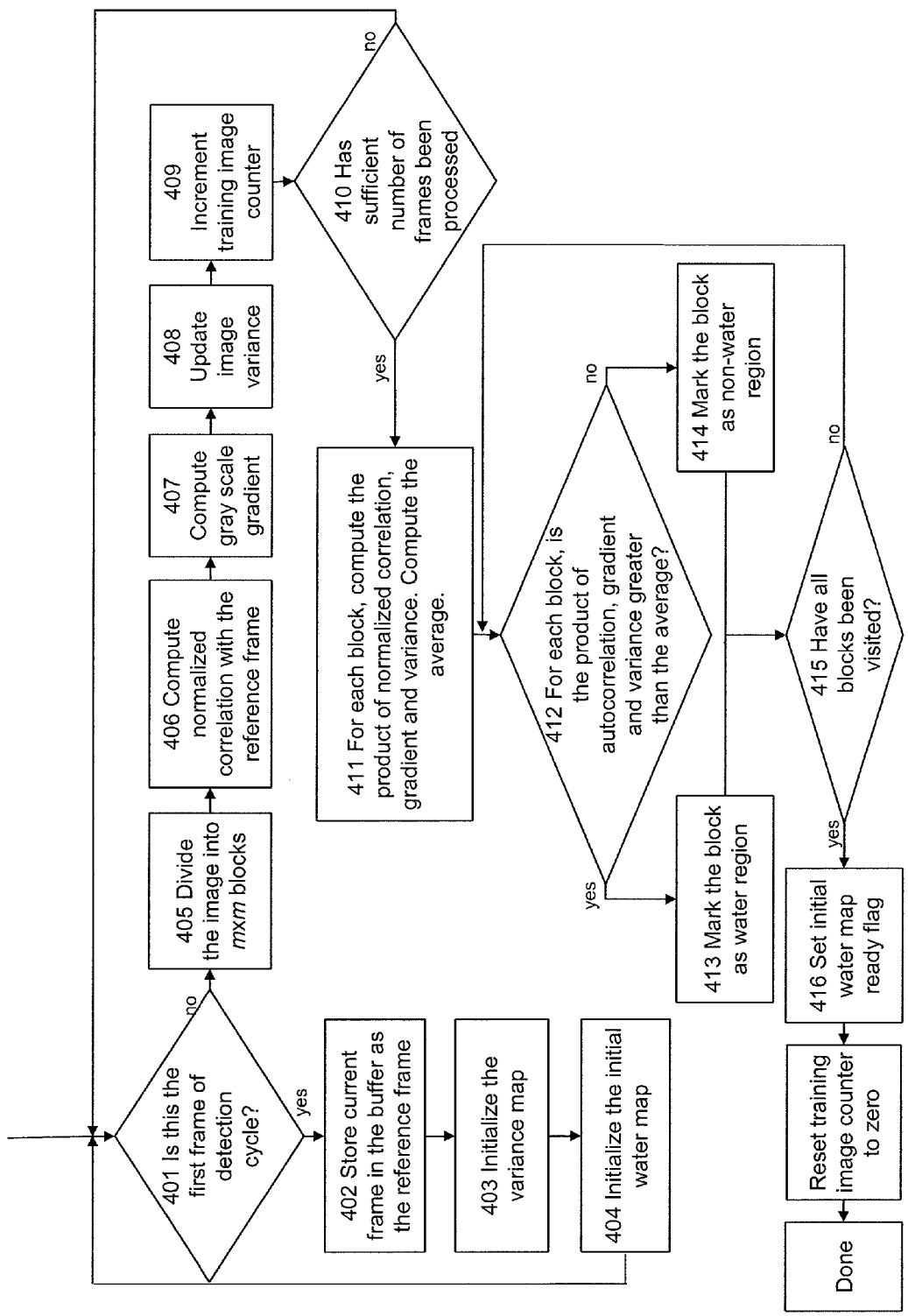
FIG. 4 depicts a flowchart describing the creating of a water map according to an embodiment of the invention.

FIG. 4 depicts a flowchart of a technique for detecting the water map. This water map my either be output as the final water map, or may be refined further. The technique may require processing a predefined number of frames to create the water map. This process may be repeated periodically in order to adapt to the changing boundaries of water body in the scene. If the technique is considering the first frame of the detection cycle (401), the technique may begin by storing the first frame of the sequence in the memory as a reference frame (402). This may be followed by initializing a variance map (403) and a water map (404). In general, the variance and water maps may correspond to an image size array. The variance map may be initialized to some arbitrary value and the water map initially may have no representation for water.

When the next useable video image arrives, the technique may divide the image into a grid of blocks (405). Each block may comprise m×m pixels. The value of m may be set to some fixed value, for example, 10 or 20, and may be less than the dimension of the image. The technique may next compute the normalized correlation of each block in relation with the reference frame (406). In statistics, correlation is a measure of the strength of the relationship between two variables. In block 406, the correlation between the pixel intensities of the reference and the current video image blocks may be computed. Normalized correlation (NCC) may be computed using the following formula, where A and B are the reference and the current image blocks, respectively, i and j represent the image row and column number, respectively, and $\overline{A}$ and $\overline{B}$ represent the average gray scale intensity for the block:

$$NCC = \frac{\sum_i \sum_j (A_{ij} - \overline{A})(B_{ij} - \overline{B})}{\sqrt{\left(\sum_i \sum_j (A_{ij} - \overline{A})^2\right)\left(\sum_i \sum_j (B_{ij} - \overline{B})^2\right)}}.$$

The technique may next compute the gray scale (also called intensity) gradient at each pixel location (407). The sum of absolute value of the gradient at each pixel within a block may represent the overall gradient of the block in the grid. In the next functional block (408), the technique may update the variance of the pixel intensity, where the variance is a measure of statistical dispersion, indicating how pixel intensity values are spread around an average value. The variance for each block in the grid may also be computed in (408) by adding the variance of every pixel within the block. The technique may increment a counter that counts the number of frames that have been analyzed thus far (409). If the number of analyzed frames is less than a specified number, the technique will wait for the next video frame (410) and repeat blocks 405-409 for the next frame. Otherwise, it may move on to the block (411).

In block 411, the multiplicative product of normalized correlation (from 406), gradient (from 407) and variance (from 408) may be computed. For each block in the grid, this product value may be compared with the average value product value of all blocks (412). If this product value is greater than the average, the entire block may be marked as a water region in the initial water map (413). Otherwise, the block is marked as non-water (414). When all blocks are processed in the grid (415), the technique may set a flag (416) as an indication to the rest of the system that a water map is ready to be used. At this point the water map is matured and the system may be ready to proceed with creating a water model as discussed in the next section.

Creating a Water Model

Figure 5:
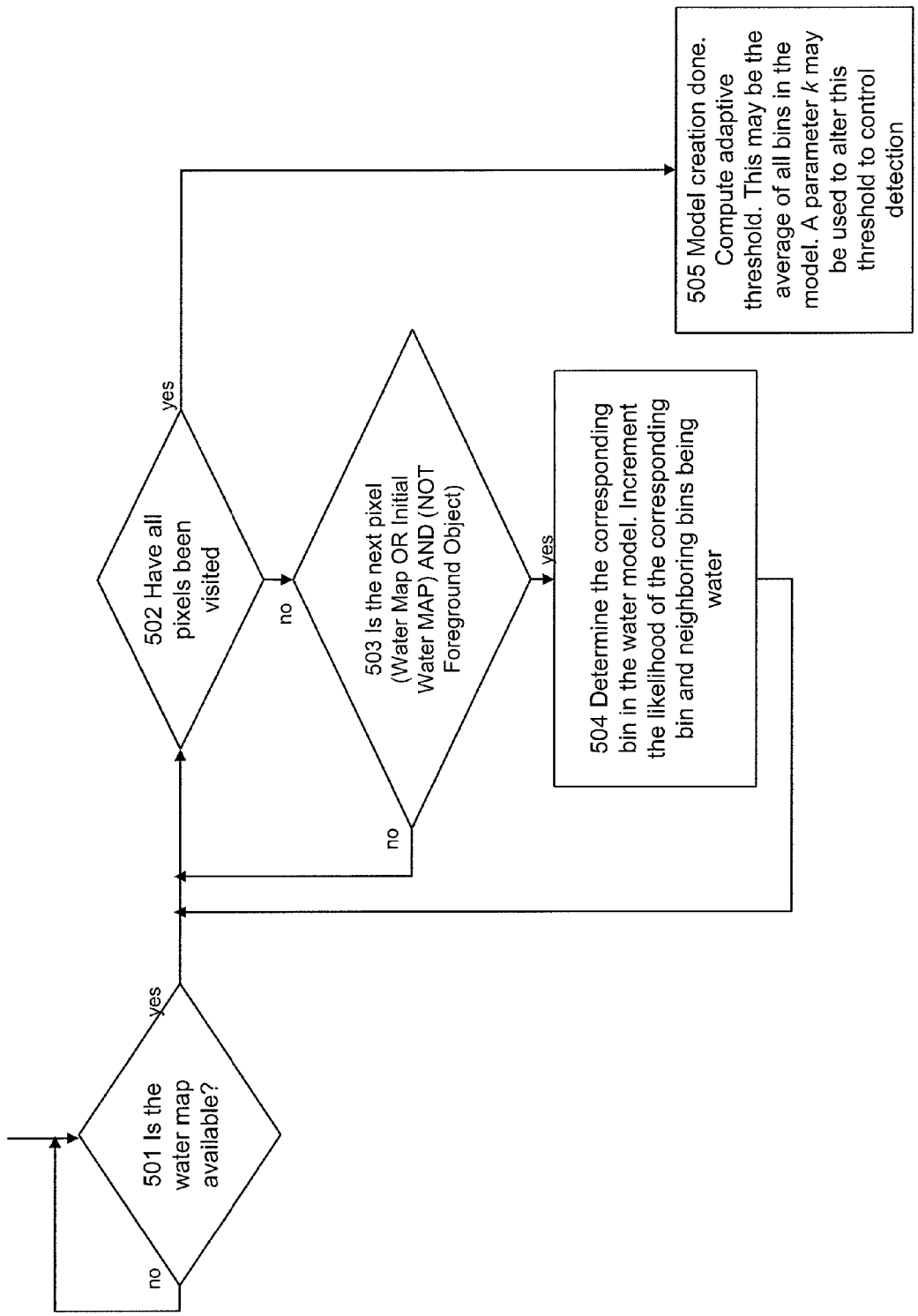
FIG. 5 depicts a flowchart describing the creating of a model for water according to an embodiment of the invention.

FIG. 5 depicts a flowchart of a technique for creating a model representing water, according to an embodiment of the invention. The technique visits each pixel in the water map, and first determines whether or not the pixel should be used for training. Only pixels with high confidence of being water should be used. Pixels which are detected as foreground objects should be excluded in the training. See, e.g., U.S. Pat. No. 6,999,600, "Video Scene Background Maintenance Using Change Detection and Classification." Therefore, the decision to use a pixel for training may be based on a logical combination of (i) the initial water map, (ii) the definite water map (if available from previous iterations) and (iii) a foreground object map, for example, from classification module 13. A pixel may be used for training if the pixel satisfies the following criterion (503): (The pixel is detected as water in the initial water map OR the pixel is detected as water in the definite water map) AND the pixel is not foreground.

Given a pixel location (row and column number) and the pixel's color value (e.g., in RGB color space), the water model may provide a joint likelihood of the pixel being water. In an implementation, the water model may be a five dimensional histogram with each bin representing the following:

Row number of the pixel, say i
Column number of the pixel, say j
Red component of the pixel color, say r
Green component of the pixel color, say g
Blue component of the pixel color, say b Note that the invention is not limited to the use of above mentioned features and is open to the use of incorporating new features and/or any other color space (for example YUV, HSV etc.). In the example given above, the bin in the water model can be accessed by using indices (i, j, r, g, b). However, due to the limited amount of physical memory available in a computer, this histogram may exceed the memory limits if used in full resolution. Therefore, the histogram may be divided into bins such that the total number of the bins for a feature is much less than the full range of the histogram. For example, an image may have a dimension of 240 rows and 320 columns; however, if each bin of the histogram represents 10 pixels, the number of bins will be 24×32, reducing the memory requirements by a factor of 100. The other dimensions may be similarly sub-sampled. Each pixel in the video image is visited and the "likelihood" count of corresponding bin may be incremented if the pixel is detected as water (504).

Once all pixels are accounted for, an adaptive threshold may be obtained by computing the average of all bins (505), which may be used in the next step dealing with the detection of a definite water map. In order to tune the technique for improved detection, this threshold can be altered by some factor k which may also be referred to as a controlling parameter. This parameter can be manually adjusted before or during the executing of the algorithm.

Re-Classification of Water/Non-Water Pixel in Definite Water Map

Figure 6:
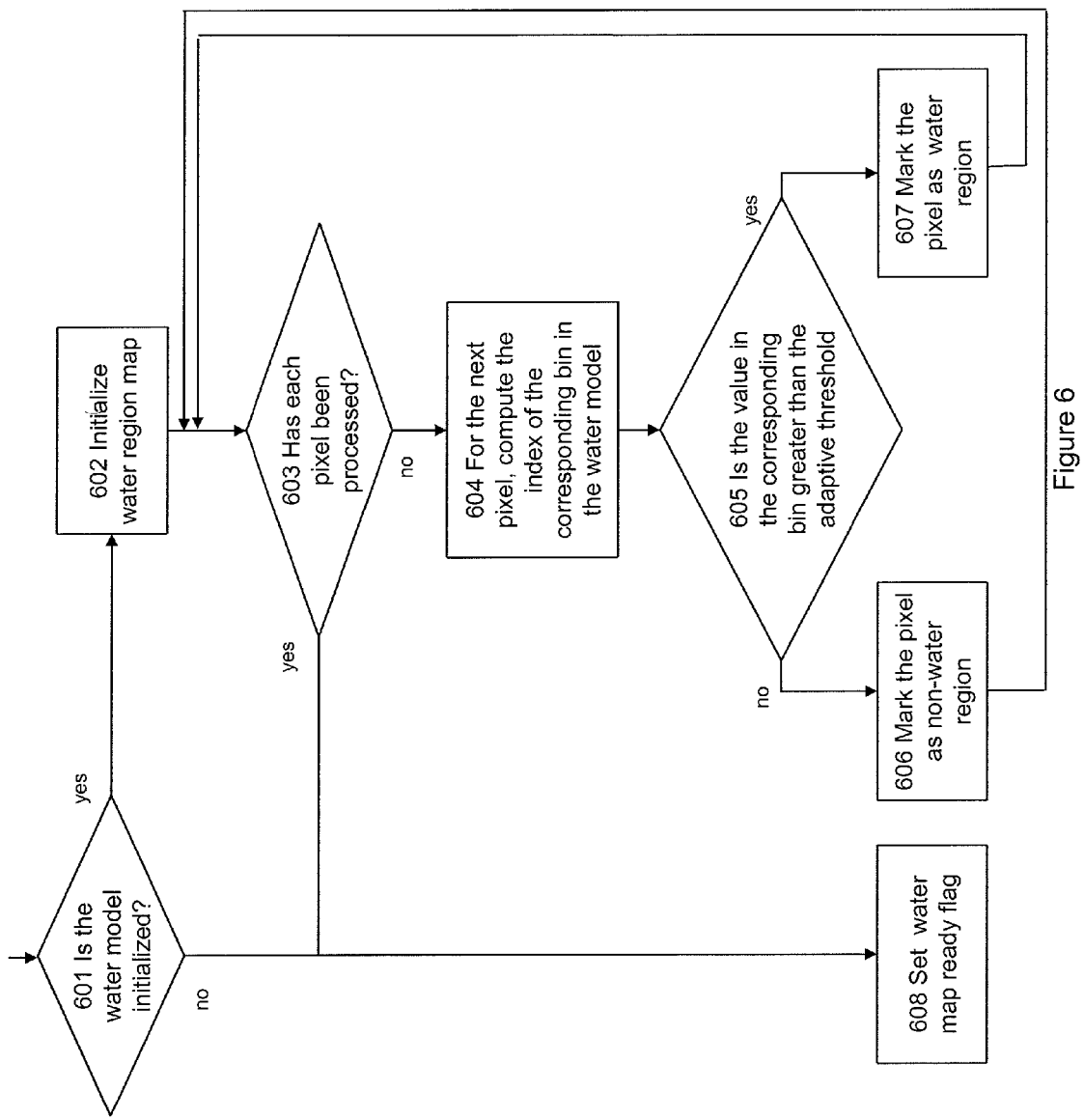
FIG. 6 depicts a flowchart describing the re-classification of each video image pixel as water/non-water according to an embodiment of the invention.

FIG. 6 depicts a flowchart of a technique for classifying each pixel in the video image as water or non-water, according to an embodiment of the invention. When the water model is available from block 505 (601), the technique first initializes a map in the memory to represent the presence of water in the scene (602). The size of this map may be same as the dimensions of the video image (rows and columns). Then each pixel in the image may be visited, and the corresponding bin in the water model histogram may be determined (604), as described in the previous section. The value in the corresponding bin may be compared with the adaptive threshold detected (605), as explained in the previous section, and if the value of the corresponding bin is higher than the adaptive threshold, the pixel is marked as a water pixel in the definite water map (607). Otherwise, the pixel is marked as a non-water pixel (606). When all pixels are visited (603), the definite water map ready flag may be set (608). This flag may be used as an indicator to the rest of the technique that the definite water map is available.

Refining the Definite Water Map

Figure 7:
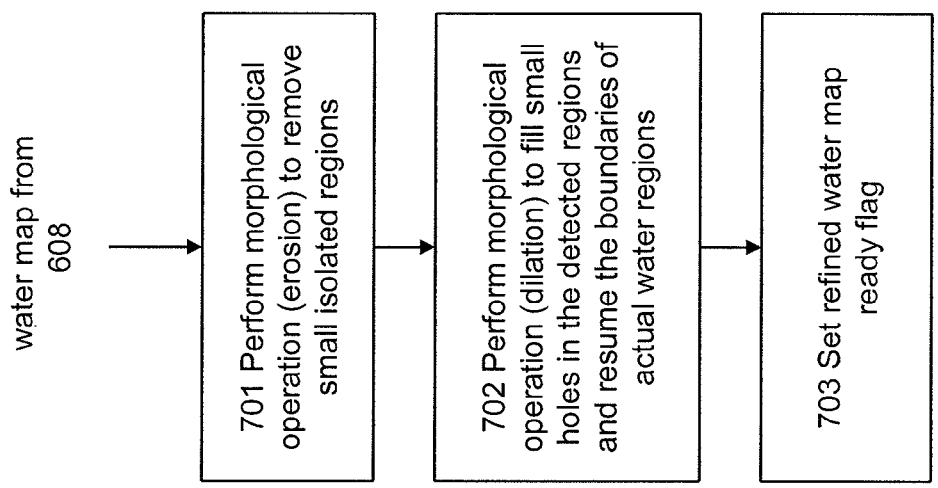
FIG. 7 depicts a flowchart describing the refinement of the water map according to an embodiment of the invention.

FIG. 7 depicts a flowchart of a technique for refining the definite water map, according to an embodiment of the invention. Various morphological operations may be performed on the map. For example, one operation is erosion, an operation that causes objects to shrink (701). The erosion operation removes outliers which often appear as single-pixel objects in the map. Another operation is dilation, an operation that causes regions to dilate or grow (702). The dilation operation fills small holes in the map that may have been caused due to misdetection and the boundaries of actual water region that were shrunk during the process of erosion. After these processes are finished, the technique may set a refined water map ready flag to inform the rest of the system that a water map is now available (703).

Using Water Models and Water Maps

The technique just described details how a water model and water map may be obtained and maintained using information from an existing surveillance system. However, to make the water map useful to the surveillance system the water map must also be able to provide information to the system. The possible benefits to a video surveillance system may include, for example:

Enabling algorithms that detect objects on water;
Improving classification of targets, for example, distinguishing between a water based and non-water based vehicle (cars vs. boats);
Calibrating a camera by analyzing the water waves; and
Calibrating a camera by tracking features on large vessels on the water.

Applications of the described technologies may include:,
Statistics gathering, e.g. creating a normal speed map and normal paths, see, e.g., U.S. Publication No. US 2006-0072010 A1, "Target Property Maps for Surveillance Systems"; and U.S. Publication No. US 2006-0066719 A1, "Method for Finding Paths in Video", both of which are incorporated herein by reference;
Activity monitoring and event analysis, e.g. unusual movements of water crafts of one type in relation to another type of water craft;
Introducing classification specific rules for surveillance, such as reporting the activity of a certain type of water craft during a restricted time interval.

Figure 8:
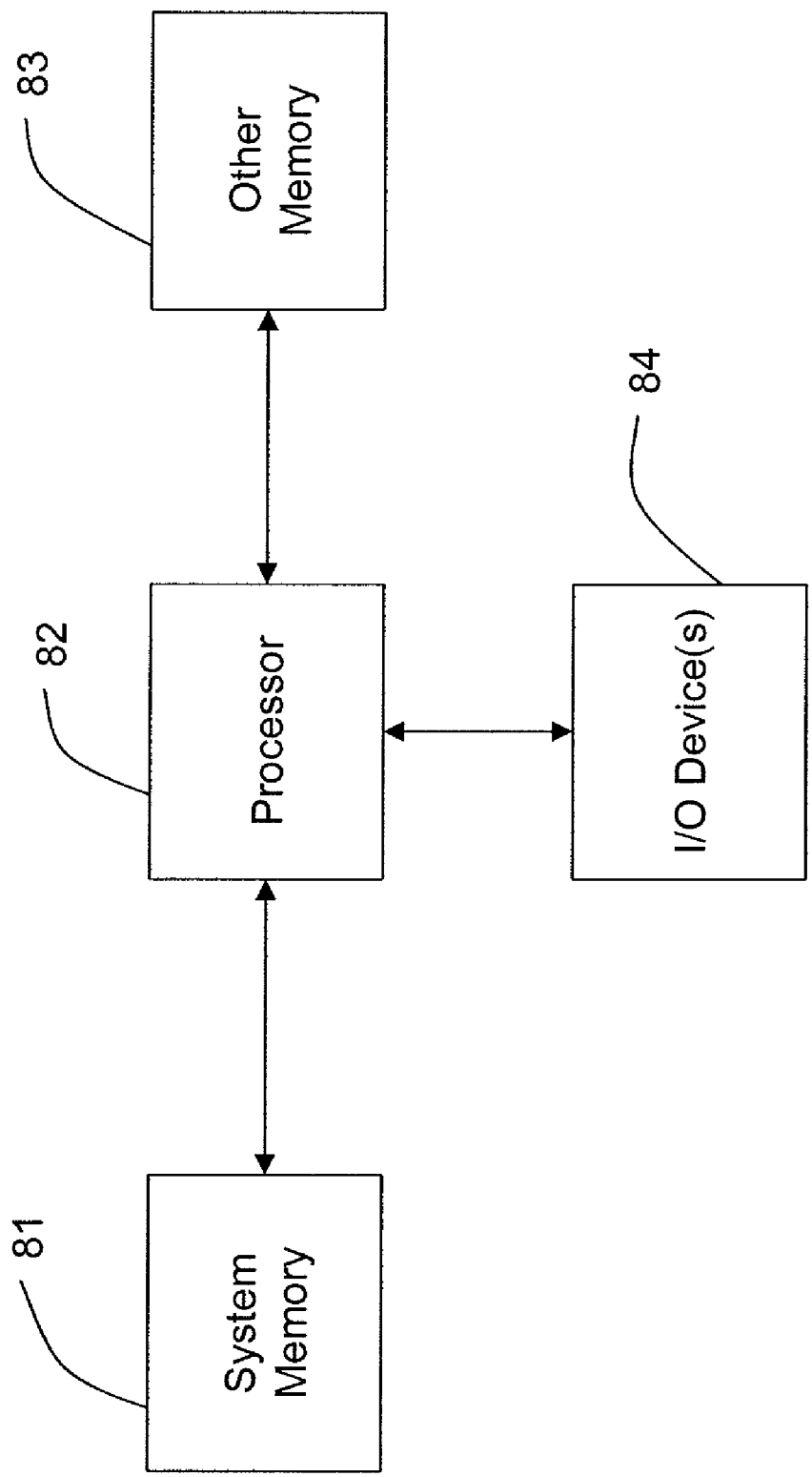
FIG. 8 depicts a block diagram of a system that may be used in implementing some embodiments of the invention.

Some embodiments of the invention, as discussed above, may be embodied in the form of software instructions on a computer-readable medium. Such an embodiment is illustrated in FIG. 8. The computer system of FIG. 8 may include at least one processor 82, with associated system memory 81, which may store, for example, operating system software and the like. The system may further include additional memory 83, which may, for example, include software instructions to perform various applications. The system may also include one or more input/output (I/O) devices 84, for example (but not limited to), keyboard, mouse, trackball, printer, display, network connection, etc. The present invention may be embodied as software instructions that may be stored in system memory 81 or in additional memory 83. Such software instructions may also be stored in removable or remote media (for example, but not limited to, compact disks, floppy disks, etc.), which may be read through an I/O device 84 (for example, but not limited to, a floppy disk drive). Furthermore, the software instructions may also be transmitted to the computer system via an I/O device 84 for example, a network connection.

The exemplary embodiments may be embodied in many different ways as a software component. For example, an embodiment may be a stand-alone software package, or an embodiment may be a software package incorporated as a "tool" in a larger software product, such as, for example, a video analysis product or a video surveillance product. An embodiment may be downloadable from a network, for example, a website, as a stand-alone product or as an add-in package for installation in an existing software application. An embodiment may also be available as a client-server software application, or as a web-enabled software application.

An embodiment may be embedded in custom or off-the shelf hardware, or may be implemented as a system on a chip or multiple chips. The exemplary embodiments may be embodied in many different ways as a combination of software and/or hardware components. For example, embodiments of the invention may be embodied on a chip, for example, in a camera, a digital video recorder, a router, or other components of a video analysis system. Embodiments of the invention may include application-specific hardware to emulate a computer and/or software that performs the techniques described herein.

The invention has been described in detail with respect to various embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A computer-based method for automatic detection of water regions in a video, the method comprising:
   generating a water map from the video; and
   outputting the water map to an output medium,
   wherein a computer performs generating the water map from the video, and
   wherein generating the water map comprises:
   a. estimating a water map of the video from video frames,
   wherein estimating the water map of the video comprises:
   i. storing a first frame of the video in memory as a reference frame;
   ii. initializing a variance map and the initial water map;
   iii. retrieving a next frame of the video and dividing the next frame into a grid of at least two blocks;
   iv. calculating a normalized correlation between the reference frame and each block in the next frame;
   v. calculating a gray scale gradient at each pixel in the next frame;
   vi. calculating the variance for each block in the grid by adding the variance of each pixel in the block;
   vii. repeating (iii) through (vi) for a specified number of next frames;
   viii. calculating a multiplicative product of the normalized correlation, the gray scale gradient, and the variance;
   ix. comparing the product with an average value of the multiplicative product over all blocks;
   x. marking a block as a water region in the initial water map when the product is greater than the average, and marking the block as a non-water region when the product is not greater than the average; and
   xi. repeating (viii) through (x) for each block, whereby the initial water map is created.

2. The method of claim 1, further comprising:
   b. estimating a statistical water model from the estimated water map;
   c. re-classifying the estimated water map using the water model and frames of the video; and
   d. refining the re-classified water map.

3. The method of claim 2, wherein the water model is a histogram comprising a plurality of bins and wherein estimating the statistical water model further comprises:
   i. for each pixel in the initial water map:
      (a) determining whether the pixel is both a water pixel and not a foreground object pixel;
      (b) determining a corresponding bin for the pixel, when the pixel is both a water pixel and not a foreground pixel;
      (c) increasing a likelihood that the corresponding bin, and bins neighboring the corresponding bin, are water; and
      (d) repeating (a) through (c) for all pixels in the initial water map, whereby the water model is complete; and
   ii. computing an adaptive threshold based on an average of all bins in the histogram.

4. The method of claim 3, wherein step (ii) of computing an adaptive threshold comprises: computing an average of all the plurality of bins.

5. The method of claim 4, wherein re-classifying the estimated water map further comprises:
   i. initializing a water region map corresponding to a frame of the video;
   ii. for each pixel in the frame:
      (a) identifying the bin corresponding to the pixel;
      (b) comparing the value of the corresponding bin to the adaptive threshold;
      (c) marking the pixel as a definite water region when the value of the bin is greater than the adaptive threshold; and
      (d) marking the pixel as a non-water region when the value of the bin is not greater than the adaptive threshold.

6. The method of claim 2, wherein refining the re-classified water map comprises at least one of eroding the water map or dilating the water map.

7. The method of claim 1, further comprising:
   detecting an object in the video sequence based on the water map.

8. The method of claim 1, further comprising:
   tracking an object in the video sequence based on the water map.

9. The method of claim 1, further comprising:
   classifying an object in the video sequence based on the water map.

10. The method of claim 1, further comprising:
    detecting an event in the video sequence based on the water map.

11. A non-transitory computer-readable medium containing instructions that, when executed by a processor, cause the processor to perform the method according to claim 1.

12. A video processing system comprising:
    a computer system; and
    the non-transitory computer-readable medium according to claim 11.

13. A video surveillance system comprising:
at least one camera to generate an input video sequence; and
the video processing system according to claim 12.

14. A method comprising:
one of downloading software using a computer to the computer over a network or providing downloadable software from a computer to another computer over a network, which software when executed by the computer, causes the computer to perform operations comprising the method of claim 1.

15. A computer system for detecting water regions in a video, wherein the computer system comprises a non-transitory computer-readable medium comprising software modules for video processing for detecting water regions in the video, wherein the software modules comprise:
a water detector module to receive a video to detect the presence of water in the video; and
means for outputting the water map to an output medium, wherein the water detector module further comprises a water estimation module to receive the video and to create an estimated water map, and
wherein the computer system further comprises:
a water model training module, to create a water model using the estimated water map;
a re-classification module to re-classify the estimated water map using the water model and frames of the video, and to create a water map; and
a refinement module to refine the water map.

16. The computer system according to claim 15, wherein said event specification interface comprises a graphical user interface.

17. The computer system of claim 15, wherein the detection module provides feedback to the water detector module.

18. The computer system of claim 15, further comprising:
a video analysis system to receive the video and the water map.

19. The computer system of claim 15, further comprising at least one of:
a detection module to detect an object in the video;
a tracking module to track a detected object;
a classification module to classify a detected object;
an event detection module to receive an output of said water detector module and to output one or more detected events; or
an event specification interface to provide one or more events of interest to said event detection module.

20. An apparatus for water detection, wherein the apparatus comprises a a non-transitory computer-readable medium comprising software modules for video processing for water detection, which when executed by a computer, causes the computer to perform the operations of:
generating a water map from the video; and
outputting the water map to an output medium,
wherein the operations comprising generating the water map comprise:
a. estimating a water map of the video,
b. estimating a statistical water model from the estimated water map,
c. re-classifying the estimated water map using the water model and frames of the video; and
d. refining the re-classified water map.

21. The apparatus of claim 20, wherein the apparatus comprises:
application-specific hardware to emulate a computer and/or software, the application-specific hardware to perform the operations of claim 20.

22. An apparatus as in claim 20, wherein the apparatus is embodied in a video camera.

23. The apparatus of claim 20, wherein estimating the water map of the video comprises:
i. storing a first frame of the video in memory as a reference frame;
ii. initializing a variance map and the initial water map;
iii. retrieving a next frame of the video and dividing the next frame into a grid of at least two blocks;
iv. calculating a normalized correlation between the reference frame and each block in the next frame;
v. calculating a gray scale gradient at each pixel in the next frame;
vi. calculating the variance for each block in the grid by adding the variance of each pixel in the block;
vii. repeating (iii) through (vi) for a specified number of next frames;
viii. calculating a multiplicative product of the normalized correlation, the gray scale gradient, and the variance;
ix. comparing the product with an average value of the multiplicative product over all blocks;
x. marking a block as a water region in the initial water map when the product is greater than the average, and marking the block as a non-water region when the product is not greater than the average; and
xi. repeating (viii) through (x) for each block, whereby the initial water map is created.

24. The apparatus of claim 20, wherein the water model is a histogram comprising a plurality of bins and wherein estimating the statistical water model further comprises:
i. for each pixel in the initial water map:
(a) determining whether the pixel is both a water pixel and not a foreground object pixel;
(b) determining a corresponding bin for the pixel, when the pixel is both a water pixel and not a foreground pixel;
(c) increasing a likelihood that the corresponding bin, and bins neighboring the corresponding bin, are water; and
(d) repeating (a) through (c) for all pixels in the initial water map, whereby the water model is complete; and
ii. computing an adaptive threshold based on an average of all bins in the histogram.

25. The apparatus of claim 24, wherein step (ii) of computing an adaptive threshold comprises: computing an average of all the plurality of bins.

26. The apparatus of claim 20, wherein re-classifying the estimated water map further comprises:
i. initializing a water region map corresponding to a frame of the video;
ii. for each pixel in the frame:
(a) identifying the bin corresponding to the pixel;
(b) comparing the value of the corresponding bin to the adaptive threshold;
(c) marking the pixel as a definite water region when the value of the bin is greater than the adaptive threshold; and
(d) marking the pixel as a non-water region when the value of the bin is not greater than the adaptive threshold.

27. The apparatus of claim 20, wherein refining the re-classified water map comprises at least one of eroding the water map or dilating the water map.

28. A video processing system comprising:
- a video processing device to accept an input video and detect a water region in the input video; and
- an output medium to output information regarding the detected water region,
- wherein the video processing device further comprises:
  - a water estimation module to receive the video and to create an estimated water map;
  - a water model training module, to create a water model using the estimated water map;
  - a re-classification module to re-classify the estimated water map using the water model and frames of the video, and to create a water map; and
  - a refinement module to refine the water map.

* * * * *

UNITED STATES PATENT AND TRADEMARK OFFICE
CERTIFICATE OF CORRECTION

| | | |
|---|---|---|
| PATENT NO. | : 7,822,275 B2 | Page 1 of 1 |
| APPLICATION NO. | : 11/757738 | |
| DATED | : October 26, 2010 | |
| INVENTOR(S) | : Rasheed et al. | |

It is certified that error appears in the above-identified patent and that said Letters Patent is hereby corrected as shown below:

In the Claims:

Claim 5, column 10, line 32, change "4" to -- 2 --.

Signed and Sealed this
Fifth Day of April, 2011

David J. Kappos
*Director of the United States Patent and Trademark Office*